United States Patent [19]

Meehan

[11] Patent Number: 4,884,064

[45] Date of Patent: Nov. 28, 1989

[54] INTRUDER DETECTION AND CONTROL APPARATUS

[75] Inventor: Adrian P. Meehan, Uckfield, England

[73] Assignee: Rentokil Limited, West Sussex, England

[21] Appl. No.: 52,738

[22] PCT Filed: Aug. 19, 1986

[86] PCT No.: PCT/GB86/00493

§ 371 Date: Apr. 16, 1987

§ 102(e) Date: Apr. 16, 1987

[87] PCT Pub. No.: WO87/01011

PCT Pub. Date: Feb. 26, 1987

[30] Foreign Application Priority Data

Aug. 20, 1985 [GB] United Kingdom ............... 8520769

[51] Int. Cl.⁴ .................................................. G08B 23/00
[52] U.S. Cl. ..................................... 340/573; 340/541; 340/691; 43/69
[58] Field of Search ............... 340/540, 541, 573, 691; 367/139; 368/9–12; 43/60, 61, 69, 1; 346/17, 20; 434/236, 433

[56] References Cited

U.S. PATENT DOCUMENTS

| 3,111,608 | 11/1983 | Boenning . | |
|---|---|---|---|
| 3,764,984 | 10/1973 | McCartney . | |
| 4,048,745 | 9/1977 | Morford | 43/69 |
| 4,242,670 | 12/1980 | Smith | 340/568 |
| 4,372,074 | 2/1983 | Arrabit | 43/69 |
| 4,503,399 | 3/1985 | Carr . | |
| 4,517,557 | 5/1985 | Agron et al. . | |
| 4,523,185 | 6/1985 | Roth | 340/541 X |
| 4,651,143 | 3/1987 | Yamanaka | 340/541 X |
| 4,658,386 | 4/1987 | Morris | 340/573 X |

FOREIGN PATENT DOCUMENTS

| 502566 | 3/1976 | Australia . |
| 505276 | 3/1976 | Australia . |
| 525038 | 5/1979 | Australia . |
| 3302917 | 10/1983 | Fed. Rep. of Germany . |
| 3211731 | 7/1984 | Fed. Rep. of Germany . |
| 1390913 | 5/1971 | United Kingdom . |
| 2039400 | 8/1980 | United Kingdom . |

OTHER PUBLICATIONS

Article, "Field Method for Census Taking of Commensal Rodents in Rodenticide Evaluations" (Special Technical Publication 680, ASTM, 1979), D. E. Kaukeinen.
Article, "One Mouse", British Food Journal, Mar.-/Apr. 1975, British Food Journal.

Primary Examiner—Joseph A. Orsino
Assistant Examiner—Jill D. Jackson
Attorney, Agent, or Firm—Merchant, Gould, Smith, Edell, Welter & Schmidt

[57] ABSTRACT

A method of and apparatus for detecting free-ranging pests, for example mice, without providing an attractant material. The presence of a pest is sensed by at least one of a plurality of sensors, a signal is emitted indicating the sensing of a pest by that sensor, and the fact that a signal has been emitted is indicated by an indicating means that is operatively coupled to the sensors.

16 Claims, 4 Drawing Sheets

INTRUDER DETECTION AND CONTROL APPARATUS

FIELD OF THE INVENTION

The invention relates to a method and apparatus suitable for use in the control of free-ranging pests. The invention has particular relevance to the control of mice, but may also be useful in the control of other pests, for example, rats or cockroaches.

BACKGROUND OF THE INVENTION

In the past the control of free-ranging pests such as mice has normally involved placing bait, which may include poison, in places that the pests can be expected to frequent, the supply of bait being replenished from time to time. While replenishment of the bait may not cause problems in relatively small buildings, problems increase in large premises, for example, factories for processing food. Moreover, in both large and small premises it is in many circumstances necessary to take steps to ensure that the bait is not tampered with or swallowed by humans or other animals. The present invention is concerned primarily with alleviating problems that have arisen in connection with methods previously adopted for the control of pests such as mice.

SUMMARY OF THE INVENTION

The present invention provides a method of detecting free-ranging pests without providing an attractant material in which method the presence of a pest is sensed by at least one of a plurality of sensors, a signal is emitted indicating the sensing of a pest by that sensor, and the fact that a signal has been emitted is indicated by an indicating means that is operatively coupled to the sensors.

The invention also provides apparatus for detecting free-ranging pests which apparatus is free from means providing an attractant material and comprises a plurality of sensors for sensing the presence of a pest, each sensor having associated therewith means for signalling that a pest has been sensed by that sensor, and indicating means for indicating that a signal has been emitted, the indicating means being operatively coupled to the sensors.

In accordance with the invention, the presence of a pest in the vicinity of one of the sensors will cause an indication of at least the first such event to be given by the indicating means. Where, as is preferred, the indicating means includes recording means, a record of at least the first such event, and preferably each subsequent event, will be made at the recording means.

The indicating means may include, for example, a warning light so that it is easy to see when an event has taken place. Where the indicating means includes both a warning light and recording means, the arrangement is preferably such that the warning light indicates that a pest has been detected by one of the sensors and that further inspection of the recording means is desirable.

When the indicating means indicates that a pest has been detected, a decision can be taken as to whether a rodenticidal operation should be carried out. If, as is preferred, the indicating means is also capable of indicating which sensor(s) detected the pest(s), a particularly accurate placement of a rodenticidal preparation is possible.

The fact that a rodenticidal operation, for example the placement of a preparation, need not take place until pests have been detected and, with the preferred apparatus, can be restricted to locations where mice or other pests are known to run, constitutes a significant improvement over previously proposed methods of pest control. It will be appreciated that with appropriate apparatus and sufficient sensors it will be possible to identify preferred runways followed by the pests in the premises in which the apparatus is installed, thus facilitating even further the correct placement of a rodenticidal preparation.

As the method and apparatus of the invention do not involve the use of an attractant material such as a foodstuff, the unnecessary introduction of extraneous materials into the areas to be protected is avoided. In accordance with the invention, however, means providing a relatively favoured environment for the pests may be provided in the vicinity of each sensor. The provision of a relatively favoured environment in the vicinity of the sensors may increase the likelihood of pests that are present in the location, for example, the building, in which the apparatus is installed, being detected by the apparatus.

Where mice are to be detected a relatively favoured environment may be provided by situating each sensor in a narrow channel, or in an enclosure, for example a box, which channel or enclosure is provided with holes through which the mice may enter or leave. We have observed that mice favour enclosed spaces, especially when these are small enough for the mice to contact opposed walls simultaneously. The use of enclosed spaces may also be advantageous in detecting other creatures having cryptic habits.

Where a narrow channel is used to provide the relatively favoured environment, the channel advantageously comprises one or more tubes running, for example, along the floor at the bottom of a wall, or up a wall, for example, in a corner. Such tubes are advantageously provided with holes at intervals along their length so that mice can enter the tubes. The tubes provide preferred runways for the mice. Sensors are so positioned that mice in the tubes can be detected. An advantageous enclosure is a small box containing the sensor, the box being provided with two holes through which a mouse can squeeze. In both the tube(s) and the box, the holes(s) and sensor(s) are normally so arranged that sensors are not triggered by a finger or other extraneous item inserted through a hole.

Any suitable sensing means may be used in accordance with the invention. Possible sensors include those responsive to changes in pressure, temperature, smell, sound (including ultrasound), and/or capacitance in the vicinity of the sensor. Transducers, especially pressure transducers, may of course be used. Other possibilities are the use of a microswitch which is activated when a mouse or other pest pushes past a wire, or any other device that is capable of responding when the pest brushes against it. Preferred sensors are those in which the pest interrupts a light beam, for example an infra-red beam. If desired such a beam may be deflected round corners using mirrors or light guides or pipes, and/or the beam could be positioned so that it is too high to be interrupted by, for example, a small insect crawling over the floor but is sufficiently low to be interrupted by, for example, a mouse.

More generally, it may in some circumstances be advantageous if the sensors are such that they do not respond to the presence of bodies substantially larger or substantially smaller than the pests it is desired to detect. For example, where the apparatus is to be used to detect the presence of mice it will normally be advantageous for the sensors to be unresponsive to people on the one hand and insects on the other. In other circumstances, however, for example, if it is desired to detect the presence of all pests of or below a certain size, it will be advantageous for the sensors to be responsive to all bodies of or below that size but unresponsive to bodies substantially above that size.

In any given method or apparatus the sensors must of course be chosen having regard to the pests to be detected and the location in which the sensors are to be installed. The sensors should as far as possible be free from the risk of responding to extraneous events, for example, vibrations due to the operation of machinery nearby. Preferably the sensors merely sense the presence of the pests and the pests are unaffected by the system.

The means for signalling that a pest has been detected by a sensor may be such that the same signal is produced by each sensor. If desired, however, each sensor, or group of sensors, may have a characteristic signal so that it is possible to identify more accurately the place where pests have been detected. This may be of particular advantage when the method and apparatus are used in very large premises.

The signals emitted on sensing of a pest by a sensor are transmitted to an indicating means which is capable of indicating the occurrence, and advantageously the time and/or the location, of at least the first event that occurs after the apparatus has been set. As indicated above, the indicating means may comprise recording means capable of recording the occurrence, and advantageously the time and/or the location of at least the first event. Preferably the recording means is also capable of recording the occurrence, and advantageously the time and/or the location, of each successive event.

If desired, each sensor can be individually linked to the indicating means, or signals from sensors in a group of sensors may be transmitted via a common link to the indicating means. Such a system, however, has the disadvantage that very great lengths of cable could be necessary in large premises, and it is relatively complicated and expensive to change the positions of the sensors. Moreover, where a common link is used, it may not be possible (depending on the type of signals used) to distinguish between the signals from different sensors.

Advantageously, there is also provided means for transmitting the signal from signalling means associated with each sensor and means for receiving the transmitted signals and passing signals to the indicating means. Thus, for example, the apparatus may include means for transmitting the signals via the main electricity supply conductors and means for receiving the signals from these conductors. Where signals are transmitted via the mains it is necessary to take into consideration fluctuations that can occur in the mains voltage and to prevent spurious responses occurring as a result of them.

An advantageous method of transmitting the signals involves the use of a radio transmitter associated with each sensor and one or more radio receivers. Preferably there is a common receiver for all the transmitters, the common receiver advantageously being in the vicinity of the indicating means. One advantage of the use of radio transmission is that the sensors can readily be moved from one location to another. Due regard must be had, however, to the surroundings in which the transmitter is to be used so that, for example, interference can be eliminated or reduced and so that the operation of surrounding equipment is not adversely affected.

A further advantageous method of transmitting the signals involves the use of infra-red light. Thus, for example, each sensor could be provided with means for transmitting infra-red light, there being one or more receivers for the infra-red light. If desired a common receiver could be used for two or more of the sensors.

When the invention is to be used for detecting the presence of a pest that could adversely affect the operation of the apparatus, the apparatus preferably comprises means for indicating that the apparatus has been so affected. Thus, for example, where the apparatus is to be used for detecting mice the apparatus advantageously includes means for indicating that part of the apparatus has been rendered inoperative by the mice (by, for example, the mice nibbling through a wire).

The method and apparatus of the invention are suitable for detecting pests in premises of all sizes. It will be appreciated that for reliable detection over the entire premises sensors will be situated at a plurality of different locations in the premises. Where increased vigilance is desirable in one particular area, for example, one particular room, a greater than average number of sensors may of course be located in that area. In very large premises it may in some cases be desirable to install more than one system according to the invention, that is to say there may be more than one indicating means, each indicating means having associated with it a plurality of sensors, but preferably there will be only one system according to the invention and thus a single indicating means for the entire premises, for example, a building in which pests are to be detected.

BRIEF DESCRIPTION OF THE DRAWINGS

Various forms of apparatus for detecting free-ranging pests constructed in accordance with the invention are described by way of example in the accompanying drawings in which like reference numerals indicate corresponding parts throughout the several views.

DESCRIPTION OF THE PREFERRED EMBODIMENTS

Figure 1:
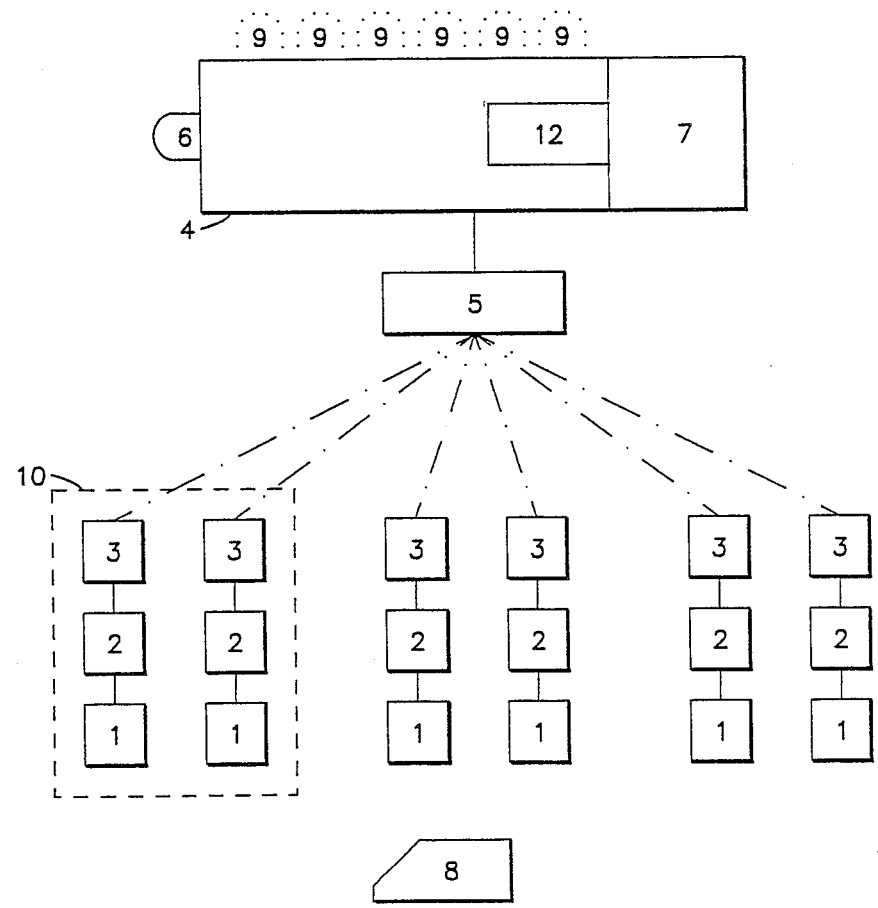
FIG. 1 is a diagrammatic representation of an apparatus in accordance with the present invention.

Referring to the Drawings, and FIG. 1 in particular, one form of the apparatus comprises a plurality of sensors 1 each of which is provided with signalling means 2 and transmitting means 3 for the signal from the signalling means.

An indicating means indicated generally by the reference numeral 4 is operatively coupled with means 5 for receiving the transmitted signals. The indicating means comprises a warning light 6 and recording means 7.

In use, when a pest 8 passes one of the sensors 1 the respective signalling means 2 emits a signal, which is transmitted by the respective transmitting means 3 to the receiving means 5. The receiving means 5 passes the signal to the indicating means 4, which illuminates the warning light 6, and records in the recording means 7 the fact that, and the time at which, the signal was emitted. If more than one signal is received, the warning light 6 is illuminated when the first signal is received and remains lit, while each signal is recorded in the recording means.

In addition to indicating occurrence, the indicating means 4, which include both time indicating means 12 and recording mechanism 7 in addition to the warning light 6, can indicate the time and/or the location of at least the first event that occurs after the apparatus has been set.

Figure 2:
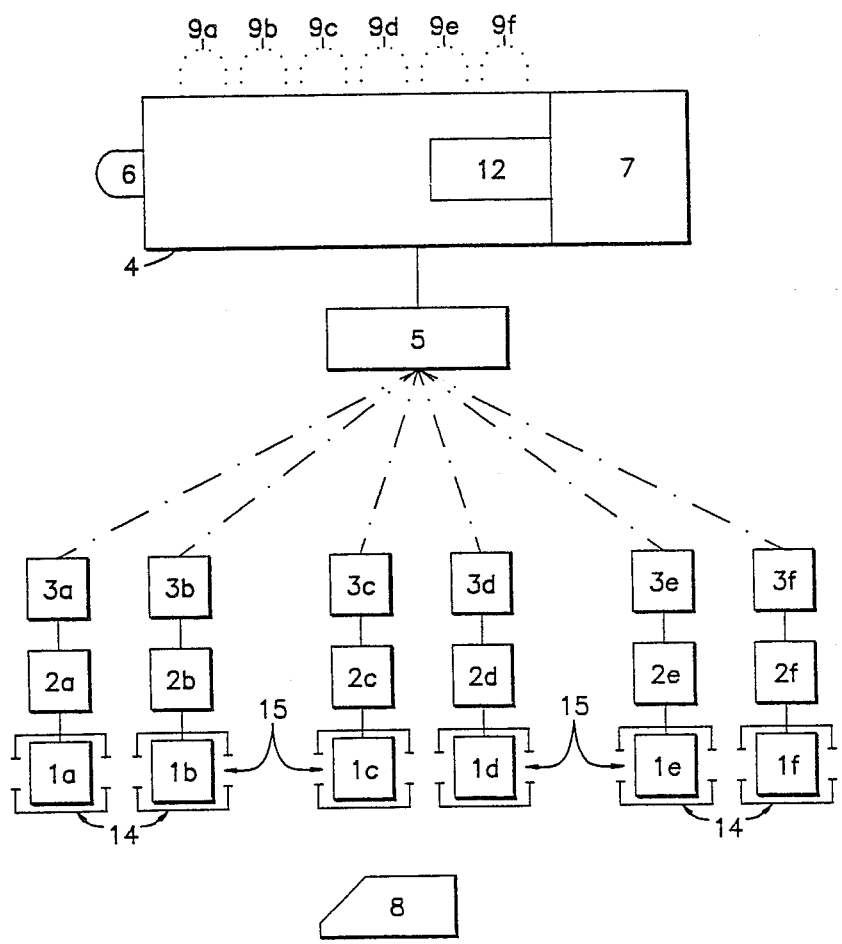
FIG. 2 is a diagrammatic representation of an alternate embodiment of the apparatus shown in FIG. 1.
Figure 3:
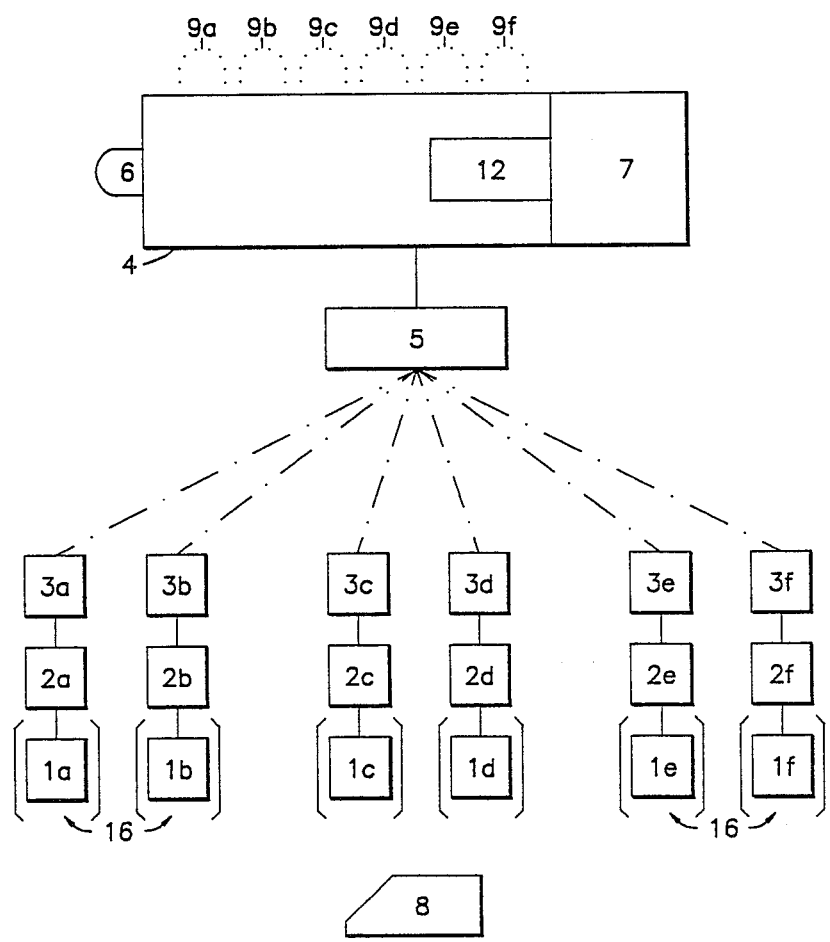
FIG. 3 is a diagrammatic representation of another alternate embodiment of the apparatus shown in FIG. 1.

Instead or in addition there may be a plurality of warning lamps 9a, 9b, 9c, 9d, 9e and 9f each associated with a respective sensor 1a, 1b, 1c, 1d, 1e and 1f as shown in FIGS. 2 and 3, and the indicating means then illuminates each respective lamp 9a, 9b, 9c, 9d, 9e or 9f if and when its respective sensor 1a, 1b, 1c, 1d, 1e or 1f senses a pest 8. The recording means records which respective signalling means 2a, 2b, 2c, 2d, 2e or 2f emitted each signal that it records.

In FIG. 2 each respective sensor 1a-1f is at least partially surrounded by an enclosure 14 provided with holes 15 through which pests 8 may enter or leave. In FIG. 3, another alternate embodiment provides channels 16 in the vicinity of each respective sensor 1a-1f.

Instead, the sensors 1 may be divided into a plurality of groups 10, and the indicating means 4 may record and indicate the group of sensors, but not the individual sensor, but which each signal was emitted.

Figure 4:
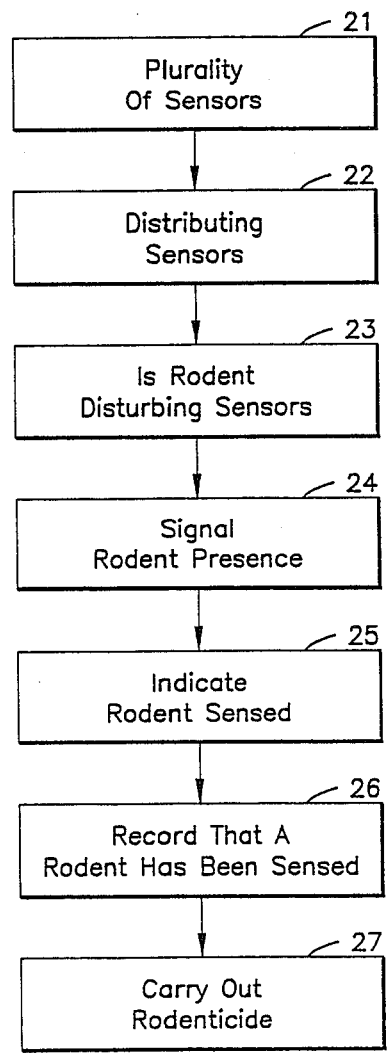
FIG. 4 is a diagrammatic representation of the steps of a method in accordance with the present invention.

In FIG. 4, a flow chart is shown which diagrammatically sets forth the steps of a preferred method of controlling free-ranging pests in an area under surveillance. The method comprises providing an apparatus free of attractant material and having a plurality of sensors (indicated generally by the reference numeral 21), distributing the plurality of sensors over the said area, each sensor having associated therewith an enclosure or channel which a rodent can enter (indicated generally by the reference numeral 22), sensing whether or not a rodent is present in the enclosure or channel associated therewith (indicated generally by the reference numeral 23), signalling with signalling means when a rodent has been sensed by the sensor, each of said sensors having signalling means associated therewith (indicated generally by the reference numeral 24), indicating with an indicating means whether or not a rodent has been sensed by any of the sensors, the indicating means being operatively coupled through the signalling means to each of the sensors (indicated generally by the reference numeral 25), recording with recording means the fact that a rodent has been sensed (indicated generally by the reference numeral 26), and carrying out a rodenticidal operation following detection of the rodent by the apparatus (indicated generally by the reference numeral 27).

I claim:

1. Apparatus for detecting whether or not free-ranging rodent pests are present in an area under surveillance, which apparatus is free from means providing an attractant material and comprises a plurality of sensors distributed over the said area, each sensor having associated therewith an enclosure or channel which a rodent can enter and being capable of sensing whether or not a rodent is present in the enclosure or channel associated therewith, and an indicating means for indicating whether or not a rodent has been sensed by any of the sensors, the indicating means being operatively coupled to each of the sensors and each sensor having associated therewith signaling means for signaling to the indicating means when a rodent has been sensed by that sensor, and the indicating means including recording means and being capable of recording and indicating the fact that a rodent has been sensed.

2. Apparatus as claimed in claim 1, wherein said sensors include a plurality of groups of sensors, the number of sensors in each group being smaller than the total number of sensors, the indicating means also being capable of indicating to which group the sensor that senses a rodent belongs.

3. Apparatus as claimed in claim 1, wherein the indicating means is also capable of indicating which sensor senses the presence of the rodent.

4. Apparatus as claimed in claim 1, wherein the indicating means is also capable of indicating the time or approximate time at which the rodent is sensed.

5. Apparatus as claimed in claimed 1, wherein said
    recording means is capable, during a given working
        period, of recording information from more than
        one sensor.

6. Apparatus as claimed in claim 1, wherein the indicating means comprises at least one warning light.

7. Apparatus as claimed in claim 1, wherein the indicating means comprises a warning light that is illuminated on sensing of the first rodent, and wherein the indicating means is not only capable of recording and indicating the sensing of the first rodent but also the sensing of subsequent rodents.

8. Apparatus as claimed in claim 1, wherein there is also provided means for transmitting signals from the signaling means and means for receiving the transmitted signals and passing the signals to the indicating means.

9. Apparatus as claimed in claim 1 wherein, each enclosure is a box.

10. Apparatus as claimed in claim 1, suitable for detecting whether or not mice are present in the said area.

11. Apparatus as claimed in claim 1, which is such that the sensors merely sense the rodents and the rodents are unaffected by the system.

12. Apparatus for detecting whether or not free-ranging rodent pests are present in an area under surveillance, which apparatus is free from means providing an attractant material and comprises a plurality of sensors distributed over the said area, each sensor being positioned in a box which a rodent can enter and being capable of sensing whether or not a rodent is present in the said box, and an indicating means for indicating whether or not a rodent has been sensed by any of the sensors, the indicating means being operatively coupled to each of the sensors and each sensor having associated therewith signaling means for signaling to the indicating means when a rodent has been sensed by that sensor, and the indicating means including recording means and being capable of recording and indicating the fact that a rodent has been sensed.

13. A method of detecting whether or not free-ranging rodent pests are present in an area under surveillance, which method comprises the steps of providing apparatus free of attractant material and having a plurality of sensors, distributing a plurality of sensors over the said area, each sensor having associated therewith an enclosure or channel which a rodent can enter, sensing whether or not a rodent is present in the enclosure or channel associated therewith, signalling with signalling means when a rodent has been sensed by the sensor, each of said sensors having signaling means associated therewith, and indicating with an indicating means whether or not a rodent has been sensed by any of the sensors, the indicating means being operatively coupled through the signalling means to each of the sensors, and recording with recording means the fact that a rodent has been sensed.

14. A method as claimed in claim 13, wherein a number of rodents are sensed and the indicating means comprises a warning light that is illuminated on sensing of the first rodent,
and wherein the sensing of subsequent rodents is recorded and indicated by the indicating means.

15. A method as claimed in claim 13, wherein the rodents are mice.

16. A method of controlling free-ranging rodent pests in an area under surveillance, which method comprises the steps of providing apparatus free of attractant material and having a plurality of sensors, distributing
the plurality of sensors over the said area, each sensor having associated therewith an enclosure or channel which a rodent can enter, sensing whether or not a rodent is present in the enclosure or channel associated therewith, signaling with signaling means when a rodent has been sensed by the sensor, each of said sensors having signaling means associated therewith,
indicating with an indicating means whether or not a rodent has been sensed by any of the sensors, the indicating means being operatively coupled through the signalling means to each of the sensors, recording with recording means the fact that a rodent has been sensed, and carrying out a rodenticidal operation following detection of a rodent by the apparatus.

* * * * *